(12) United States Patent
Ravilisetty (10) Patent No.: US 7,025,902 B2
(45) Date of Patent: Apr. 11, 2006

(54) GREEN EMITTING PHOSPHOR MATERIAL AND PLASMA DISPLAY PANEL USING THE SAME

(75) Inventor: Padmanabha Rao Ravilisetty, Highland, NY (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/791,025

(22) Filed: Mar. 2, 2004

(65) Prior Publication Data

US 2005/0194570 A1 Sep. 8, 2005

(51) Int. Cl.
*C09K 11/80* (2006.01)

(52) U.S. Cl. ............... 252/301.4 R; 313/582; 313/584

(58) Field of Classification Search ......... 252/301.4 R; 313/582, 584

See application file for complete search history.

(56) References Cited

U.S. PATENT DOCUMENTS

| | | | | |
|---|---|---|---|---|
| 4,085,351 A | 4/1978 | Takahashi et al. | ........... | 313/486 |
| 4,150,321 A | 4/1979 | Schetters et al. | ........... | 313/486 |
| 5,868,963 A | 2/1999 | Thi et al. | ................. | 252/301.4 |
| 5,989,455 A | 11/1999 | Hisamune et al. | ........ | 252/301.4 |
| 6,222,312 B1 | 4/2001 | Ghosh et al. | ................ | 313/487 |
| 6,423,248 B1 | 7/2002 | Rao et al. | ................. | 252/301.4 |

FOREIGN PATENT DOCUMENTS

| | | |
|---|---|---|
| EP | 0 697 453 | 2/1996 |
| EP | 0 908 502 | 4/1999 |
| EP | 1 359 205 | 11/2003 |
| JP | 49-123992 | * 11/1974 |
| WO | WO 98/37165 | 8/1998 |

OTHER PUBLICATIONS

Fluorescence in β-A12 03- Like Materials of K, Ba and La Activated with Eu2+and Mn2+, Japanese Journal of Applied Physics, Tokyo Shibaura Electric Co., Ltd., by Masaaki Tamatani, vol. 13, No. 6, Jun. 1974, pp. 950-956.

Philips Technical Review, "The Behaviour of Phosphors with Aluminate Host Lattices", Sommerdijk et al., v. 37, 1977 No. 9/10.

Phosphor Handbook, Phosphor Research Society, "Principal Phosphor Material and Their Optical Properties" Chapter 3, Section 2, by Masaaki Tamatani.

* cited by examiner

*Primary Examiner*—C. Melissa Koslow
(74) *Attorney, Agent, or Firm*—Ohlandt, Greeley, Ruggiero & Perle LLP.

(57) ABSTRACT

A green emitting lanthanum aluminate phosphors activated with manganese and alkali for plasma display panels (PDP) having an empirical formula:

$$La_{2-x-y}B_{22}O_{36}:Mn_x.A_y$$

wherein: A=Li, Na or K; B=Al or Al+Ga; and $0.01 \leq x \leq 0.1$ and $0.01 \leq y \leq 0.1$ is provided. The phosphor has a band emission in green region, peaking at 515 nm when excited by 147 and 173 nm radiation from Xenon gas mixture, a uniform particle size distribution (0.01 to 10 microns), which is a size distribution appropriate for thin phosphor screens required for a variety of flat panel display and lamp applications. They exhibit high brightness, good color saturation, good stability and shorter persistence under VUV excitation.

38 Claims, 11 Drawing Sheets

GREEN EMITTING PHOSPHOR MATERIAL AND PLASMA DISPLAY PANEL USING THE SAME

BACKGROUND OF THE INVENTION

1. Field of the Invention

The present invention relates to the preparation and growth of small size particles $Mn^{2+}$ and alkali doped lanthanum aluminate phosphor by solid state and sol-gel methods. More specifically, the present invention provides green emitting $Mn^{2+}$ and alkali doped lanthanum aluminate phosphor and process by thermally decomposing salts of lanthanum, manganese, alkali and alumina or sol-gel powders.

2. Description of the Related Art

The plasma display panel (PDP) as a medium of large format (60+") television (TV), particularly high definition TVs (HDTV's) is gaining attention over cathode ray tube (CRT) based TVs due to its' high performance and scalability. Although, CRT works with less power and having better picture quality, it has size limitation. Larger screens (CRT) of diagonal size more than 40 inches have larger depth and very heavy. Conversely, diagonal size of PDP is growing day by day, as there is no problem with depth and weight.

Figure 1A:
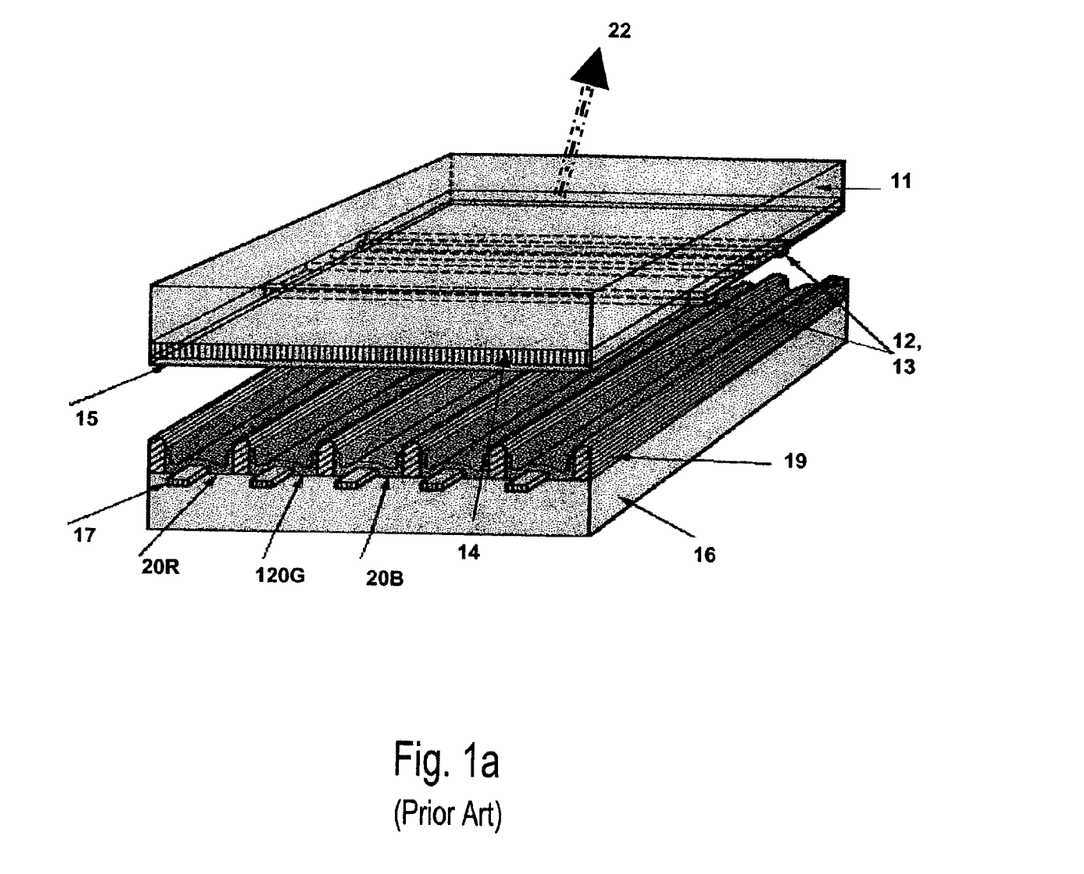
FIG. 1a represents cross sectional view of AC plasma display panel.
Figure 1B:
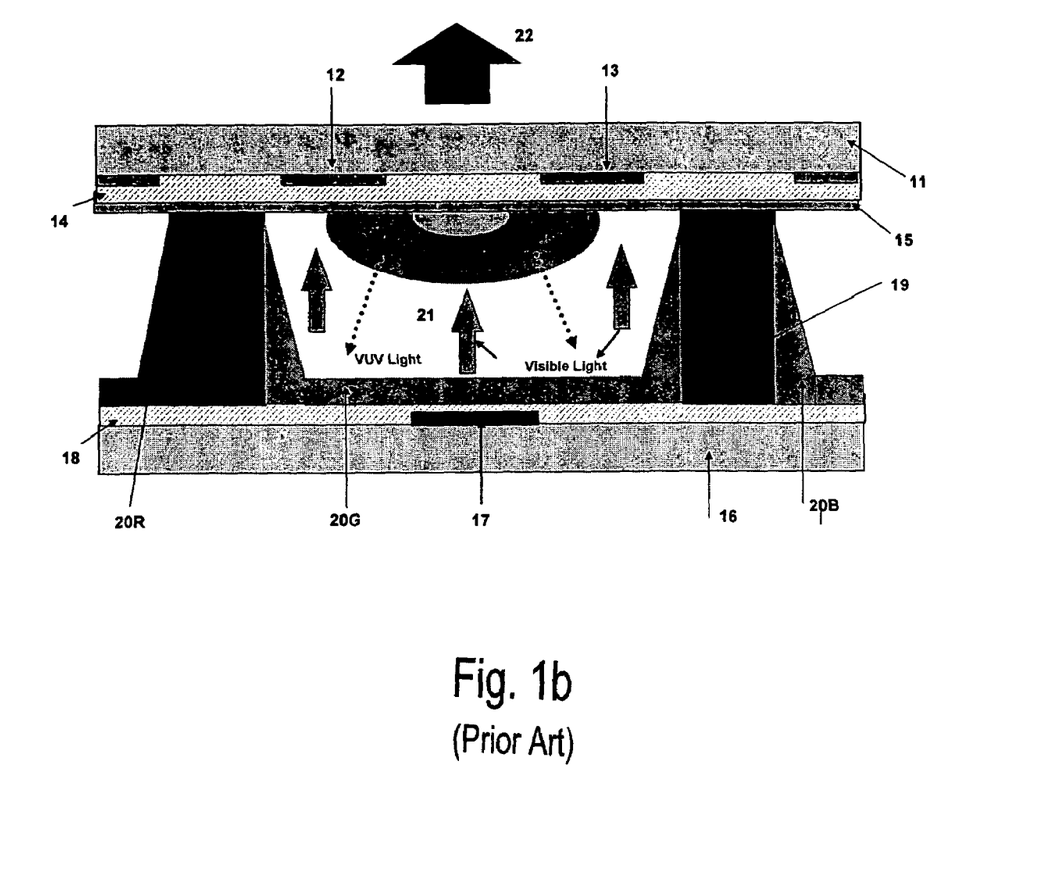
FIG. 1b represents cross sectional view of single cell with three different phosphors.

The structure of a PDP, which is known in the art, is described in FIGS. 1a and 1b. FIGS. 1a and 1b represents the cross section of an AC PDP. The plasma display has of two large area glass substrates 11, 16. Front plate 11 is made with sustain electrode 12 and scanning electrode 13, covered with thick dielectric layer 14 and a thin protection layer (MgO) 15. Back plate 16 is made with address electrodes 17, reflective layer 18, barrier ribs 19 and red phosphor 20R $(Y,Gd)BO_3:Eu^{2+}$, green phosphor 20G $ZnSiO_4:Mn^{2+}$ (P1) or the blend of $ZnSiO_4:Mn^{2+}$ and $Y,GdBO_3:Tb^{3+}$, blue phosphor 20B $BaMgAl_{10}O_{17}:Eu^{2+}$ coated by screen printing or ink jet process. Both the glass plates are frit sealed together and filed the space 21 with Xe, Ne gas mixture. When voltage isapplied, a discharge is developed in the space 21 producing Vacuum UV (147 and 173 nm). When phosphors 2ORGB are excited by VUV photons, they emit respective visible radiations viewed through the transparent front plate as an image 22.

The luminous efficiency of a PDP depends upon various factors including materials such as phosphors, gas mixture, dielectric layer, reflective layer, black matrix, electrodes, cell dimension and shape, nature, size and shape of electrodes, address waveforms, operating voltages, etc. The performance and lifetime of a PDP is strongly related to the nature of phosphors and their resistance to energetic discharge ions, electrons, and solarization from VUV arising from Xe/Ne gas discharge. Compared to standard emissive display such as CRTs (5–6 lm/W), the efficiency of a PDP is low (1–2 lm/W).

To improve the overall efficiency of PDPs, considerable developments related to materials, design, process and electronics are under way. Efforts are also being made to develop new phosphors as well as to improve existing phosphors. Due to vacuum UV specific wavelengths available from Xe discharge (147 nm and 173 nm), only a limited number of lamp phosphors are suitable for PDP applications. In addition to high luminous efficiency, PDP phosphors should have longer life or stability, required persistence, suitable color coordinates, color temperature, and color saturation.

The main application of large area plasma displays will be HDTV and high information content presentation. HDTV and similar type of display devices should have phosphors with low dielectric constant, required decay time, high resolution and high brightness for high performance. Screens coated in a close rib structure or closed cell structure with small particles exhibit higher packing density and also need lesser binder content.

Persistence value, which is defined as being 10% of the initial brightness, is another concern in selecting a phosphor, and should be between 4 and 9 ms, also. The three phosphors (red, green and blue) currently used in PDP's have different dielectric constants and particle morphology. Due to their physical nature, all of the three phosphors need different rheology of phosphor paste as well as different screening processes. In PDP applications these phosphors exhibit different electrical characteristics in a finished panel. This results in compromises in the performance of the display.

HDTV and similar type of devices should have high resolution and higher brightness for better performance. This can be achieved only with thin phosphor screens formed with very small phosphor particles (1–5 microns) in a close rib structure particularly in the case of PDP's. Screens with small particles have a higher packing density and also require lower binder content. Manganese activated zinc silicate phosphor with or without terbium activated yttrium gadolinium borate is currently used in plasma display panels (PDP) as a green emitting component due to its availability and high quantum efficiency.

The higher dielectric constant of zinc silicate phosphor is of particular concern as it charges more than its' blue and red counterparts and this results in a higher sustainer voltage. When compared with red and blue emitting phosphors, zinc silicate phosphor also exhibits longer persistence, lower dielectric constant, negative discharge and faster saturation with the VUV flux. Another suitable green candidate, Tb activated yttrium gadolinium borate, which shows lower color purity is described in U.S. Pat. No. 6,004,481. As a trade off, PDP industry is adopting the blend of P1 and Tb activated borate. Efforts are being made to develop new phosphors to satisfying all requirements and replace existing Mn activated zinc silicate phosphor or the blend of silicate and borate.

Some other phosphor candidates based on alkali halide aluminates are being suggested in Phosphor Handbook. U.S. Pat. Nos. 4,085,351; 5,868,963; and 6,423,248 B1 disclose the application of manganese activated aluminate phosphor with either of calcium, strontium, barium, magnesium or zinc in a gaseous discharge light-emitting element. European Patent No. EP 0 908 502 A1 teaches the preparation of barium or strontium magnesium aluminate by firing respective oxides or carbonate in presence of flux $(AlF_3)$ at 1450° C. for 48 hours (total time). International Patent Application No. WO 98/37165 describes a method of making oxygen containing phosphor powder, which includes alkaline earth aluminates by spray techniques. European Patent No. EP 1 359 205 A1 describes the method of preparation of various green emitting phosphors has La, Mg, Zn aluminates with Tb, Mn as activators.

Other related aspects to such phosphors are described in U.S. Pat. Nos. 4,150,321; 5,989,455; and 6,222,312 B1; European Patent No. 0 697 453 A1; International Patent No. WO 98/37165 by Hampden-Smith Mark, et al.; and publications entitled (1) "Fluorescence in $\alpha$-$Al_2O_3$-like materials of K, Ba, La activated with $Eu^{2+}$ and $Mn^{2+}$" by M. Tamatani, Jap. J. Applied Physics, Vol. 13, No. 6, June 1974 pp950–956; (2) "The behavior of phosphors with aluminate host lattices" by J. L. Sommerdijk and A. L. N. Stevels, Philips Tech. Review Vol. 37, No. 9/10, 1977 pp221–233; and (3) "Principal phosphor materials and their optical properties" by M. Tamatani in "Phosphor Handbook" edited by S. Shionoya and W. M. Yen, CRC Press (1999) pp. 153–176.

SUMMARY OF THE INVENTION

Accordingly, it is an object of the present invention to provide a phosphor and method of preparation of manganese activated and alkali lanthanum aluminate phosphor having the empirical formula:

$$La_{2-x-y}B_{22}O_{36}:Mn_x.A_y$$

wherein: A=Li, Na or K; B=Al or Al+Ga; and $0.01 \leq x \leq 0.1$ and $0.01 \leq y \leq 0.1$.

The phosphor is prepared by thermally decomposing the powder obtained by method including the steps of: mixing a source of alkali, such as, an alkali metal salt, a source of manganese, a source of lanthanum and a source of aluminum; reacting a dilute solution comprising a source of alkali halides, a source of lanthanum, a source of manganese and an organic precursor providing a source of aluminum, in an acid medium to form a dilute gel (sol-gel process); and converting the dilute gel into a xerogel powder (room temperature drying); converting the dilute gel into an aerogel powder (vacuum drying); or converting the dilute gel into a gel powder (spray drying), at specified temperatures, having a band emission in green region, peaking at 515–516 nm when excited by 147 and 173 nm radiation from Xenon gas mixture.

The present invention also provides comparative performance data on the lanthanum aluminate phosphors that are activated with manganese (Mn$^{2+}$) and alkali such as lithium (Li$^+$) synthesized by two different processes: conventional solid-state reaction process (0.1 to 10 microns) and sol-gel process (0.01 to 5 microns).

Phosphor materials are extremely sensitive to impurities, even at ppb levels. The low-temperature process minimizes the potential for cross contamination. Some of the unwanted impurities left in the materials from high temperature calcination may pose a threat to the performance of a phosphor. As the size of the phosphor particle decreases, the probability of electron and hole capture to the impurity increases and the e–h localization enhances the recombination rate via the impurity. The optimum impurity concentration (activator) level can be further increased with small particle size. This can be achieved by starting with sub micron size starting chemicals or sol gel process.

The green phosphor of the present invention is capable of absorbing the photons of vacuum ultra violet light and converting them into photons of visible light. Accordingly, the green phosphor described herein is suitable to use in lamps and displays.

DETAILED DESCRIPTION OF THE INVENTION

The present invention provides a method of preparation and growth of small size particles Mn$^{2+}$ and alkali doped lanthanum aluminate phosphor, particularly green emitting Mn$^{2+}$ and alkali doped lanthanum aluminate phosphors, by solid sate and sol-gel methods. The method includes the steps of thermally decomposing salts of lanthanum, manganese, alkali halide and alumina or sol-gel powders obtained from dilute solution comprising a source of an lanthanum, a source of manganese and an organic precursor providing a source of aluminum, in an acid medium (sol-gel process) or xerogel powder (drying gel from sol-gel process at room temperature) or aerogel powder (drying the gel from sol-gel in vacuum); or gel powder obtained by spray drying, at temperature (1000 to 1400 C) for 2 to 6 hours in air and refired at 1000–1300° C. in presence of forming gas (95.5% N$_2$ and 4.5% H$_2$) for 2 to 6 hours.

In a preferred embodiment, the green emitting Mn and alkali metal (i.e., Li, Na or K) activated lanthanum aluminate phosphor according to the present invention has the empirical formula:

$$La_{2-x-y}Al_{22}O_{36}:Mn_x.A_y$$

wherein: A=Li, Na, K and $0.01 \leq x \leq 0.1$ and $0.01 \leq y \leq 0.1$.

In another preferred embodiment, the green emitting Mn and alkali metal (i.e., Li, Na or K) activated lanthanum aluminate phosphor according to the present invention has the empirical formula:

$$La_{2-x-y}B_{22}O_{36}:Mn_x.A_y$$

wherein: A=Li, Na or K; B=Al+Ga; and $0.01 \leq x \leq 0.1$ and $0.01 \leq y \leq 0.1$.

The green emitting manganese-activated lanthanum aluminate phosphor particles have a uniform particle size distribution (0.01 to 10 μm) that are suitable for use in plasma display panels (PDP). Such particles can be prepared from respective oxides, nitrates, oxalates and organic precursors which form small particles that improve the performance parameters of higher brightness, shorter persistence, better stability, longer life and good color saturation in PPD applications.

There are a number of display applications where a phosphor with high brightness, shorter persistence, colors purity (saturation), better stability and long life span (time of operation) would significantly improve the display's performance. In a display, the green component is very important, as the human eye photonic response has its peak sensitivity at approximately 535 nm (green component of the visible spectrum).

Since commercially available phosphor based on Mn activated zinc silicate or barium magnesium aluminate and terbium activated yttrium, gadolinium borate fail to satisfy all the above requirements, a new phosphor and its synthesis process that overcomes the above limitations was developed.

The green phosphor according to the present invention is capable of absorbing the photons of vacuum ultra violet light and converts into photons of visible light and is suitable to use in lamps and displays. Further, the small size phosphor particles are particularly suitable for use in applications in which a high packing density is required. The result of this development effort is the basis of the present invention. This invention provides $Mn^{2+}$ and $alkali^{1+}$ activated lanthanum aluminate phosphor, method of synthesizing and uses the same in PDP's.

The phosphor is prepared by a method having the steps of:
reacting a dilute solution comprising a source of alkali, a source of lanthanum, a source of manganese and a source of aluminum, in an acid medium to form a gel;
converting the gel into a gel powder by removing excess water; and
thermally decomposing the powder at specified temperatures to produce the phosphor.

The source of lanthanum can be lanthanum oxalate, lanthanum nitrate, lanthanum oxide, or mixtures thereof; the alkali metal salt can be alkali halide, alkali nitrate, alkali carbonate, alkali hydroxide, or mixtures thereof; the source of aluminum can be aluminum oxide, aluminum isopropoxide, aluminum s-butoxide, or mixtures thereof.

The gel can be sprayed ultrasonically and dried, i.e., spray dried, to form a gel powder or vacuum dried to form the gel powder as an aerogel prior to thermal decomposition. According to the method of the present invention, the gel can be spray dried to form gel powder and the gel powder can be crushed to form a powder prior to thermal decomposition. Alternatively, the gel can be sprayed ultrasonically and dried to form gel powder and the gel powder can be crushed to form a powder prior to thermal decomposition. The gel can also be dried to form a xerogel and the xero-gel can be crushed to form a powder prior to thermal decomposition. The gel can be thermally decomposed in an open atmosphere at a temperature from abut 1000° C. to about 1400° C. and then at a temperature from about 1000° C. to about 1300° C. in forming gas.

Preferably, the phosphor has a particle size from about 0.01 microns to about 10.0 microns and exhibits a relative intensity (AU) at 147 nm excitation from about 90 to about 100 and relative intensity (AU) at 173 nm excitation from about 90 to about 105 with half width from about 23 to about 25 nm, a persistence from about 7 ms to about 10 ms, color coordinates of x from about 0.116 to about 0.136 and y from about 0.752 to about 0.782.

Accordingly, the phosphor can be prepared by thermally decomposing a powder obtained by mixing a source of alkali, such as, an alkali metal salt, a source of manganese, a source of lanthanum and a source of aluminum; reacting a dilute solution comprising a source of alkali halides, a source of lanthanum, a source of manganese and an organic precursor providing a source of aluminum, in an acid medium to form a dilute gel (sol-gel process); and converting the dilute gel into a xero-gel powder (room temperature drying); converting the dilute gel into an aero-gel powder (vacuum drying); or converting the dilute gel into a gel powder (spray drying), at specified temperatures.

The formation of the lanthanum aluminate solid solution is critical and is highly dependent on the reaction temperature and conditions. In this invention, an aqueous based process is adopted along with solid state by considering the cost and availability of the starting chemicals. Since the purity of starting chemicals is very important to the synthesis of phosphors, the starting chemicals are typically 99.9–99.999% in purity. It is important to minimize the concentration of specific contaminants such as Fe, Co, Ni, which can seriously degrade the phosphor performance.

Required metal (La,Mn,Li,Na and K) solutions are also prepared by mixing appropriate amounts of respective metal nitrates in a lukewarm Di water to obtain 0.05–0.1M solutions. The metal hydroxide precursor was prepared by precipitating an aqueous solution of metal chloride or metal nitrate (0.01–0.05M) in water by the addition of a base such as ammonium hydroxide to the solution. Stoichioemetric quantities of metal solutions and aluminium isopropoxide or aluminum s-butoxide are mixed. The metal/isopropoxide or aluminum s-butoxide solution is transferred to a round bottom flask and peptized at 80–100° C. for 9–18 hours in a stirrer mantle. In the present invention inorganic acid such as $HNO_3$ or HCl have been employed to maintain a low pH which is required to effect gelation.

After the pepitization, sol/gels are left in a container until they become a thick gel (3–5 days) and then a xerogel. Aerogels are also prepared from the same dilute gels by extracting the water and other solvents in a vacuum through a cold trap. These xerogels or aerogels are transferred into a lab oven at 60–70° C. and left for a day or until becoming powder. This step is inserted to accelerate the removal of any resisdual solvent. Gel powders are also prepared by spray drying. Dilute gels are sprayed through a fine nebulizer into a 4" diameter glass tubing which has been heated to 120–150° C. An alternate process for forming particles can be accomplished using an ultrasonic aerosol generator. After drying, gel powder is collected and fired for 2 hours at 400° C. to burn-out residual organic components.

Required amounts of metal salts such as oxalates, carbonates, fluorides of La, Li, Mn are mixed with aluminum oxide preferably gamma-alpha alumina of 0.01–0.02 micron powder with surface area 100 $m^2/g$ and flux materials such as ammonium fluoride in a mortor and psetle. The charge contains mixed powders of solid state or powders obtained from sol-gel process is transferred into high grade alumina crucibles and calcined in air at 1000 to 1400° C. for 2 to 6 hours. The fired powders are transferred in to high grade alumina boats and refired in a tube furnace in presence of foriming gas (4.5% of $H_2$ and 95.5% of $N_2$) at 1000 to 1300° C. for 2 to 6 hours. Reducing atmosphere such as forming gas or carbon mooxide or equvalent helps to change the $Mn^{3+}$ and higher states to divalent manganese state ($Mn^{2+}$).

The powder can be thermally decomposed in an open atmosphere at 1300° C. and then at a temperature equal 1200° C. in a forming gas contains 4.0 to 5.0% of $H_2$ and remaining $N_2$.

Preferably, the phosphor has a particle size in the range of 0.01 to 10.0 microns. The powder has a particle size in the range of 0.05 to 5.0 microns, preferably 0.01 to 3.0 microns, more preferably, 0.01 to 0.02 microns.

Preferably, the phosphor has from about 1.8 mole to about 1.98 mole of lanthanum, from about 0.01 mole to about 0.1 mole of manganese, and about 0.01 mole to about 0.1 mole of alkali and 22.0 mole of aluminum.

FIG. 1a represents cross sectional view of AC plasma display panel.

FIG. 1b represents cross sectional view of single cell with three different phosphors.

Figure 2:
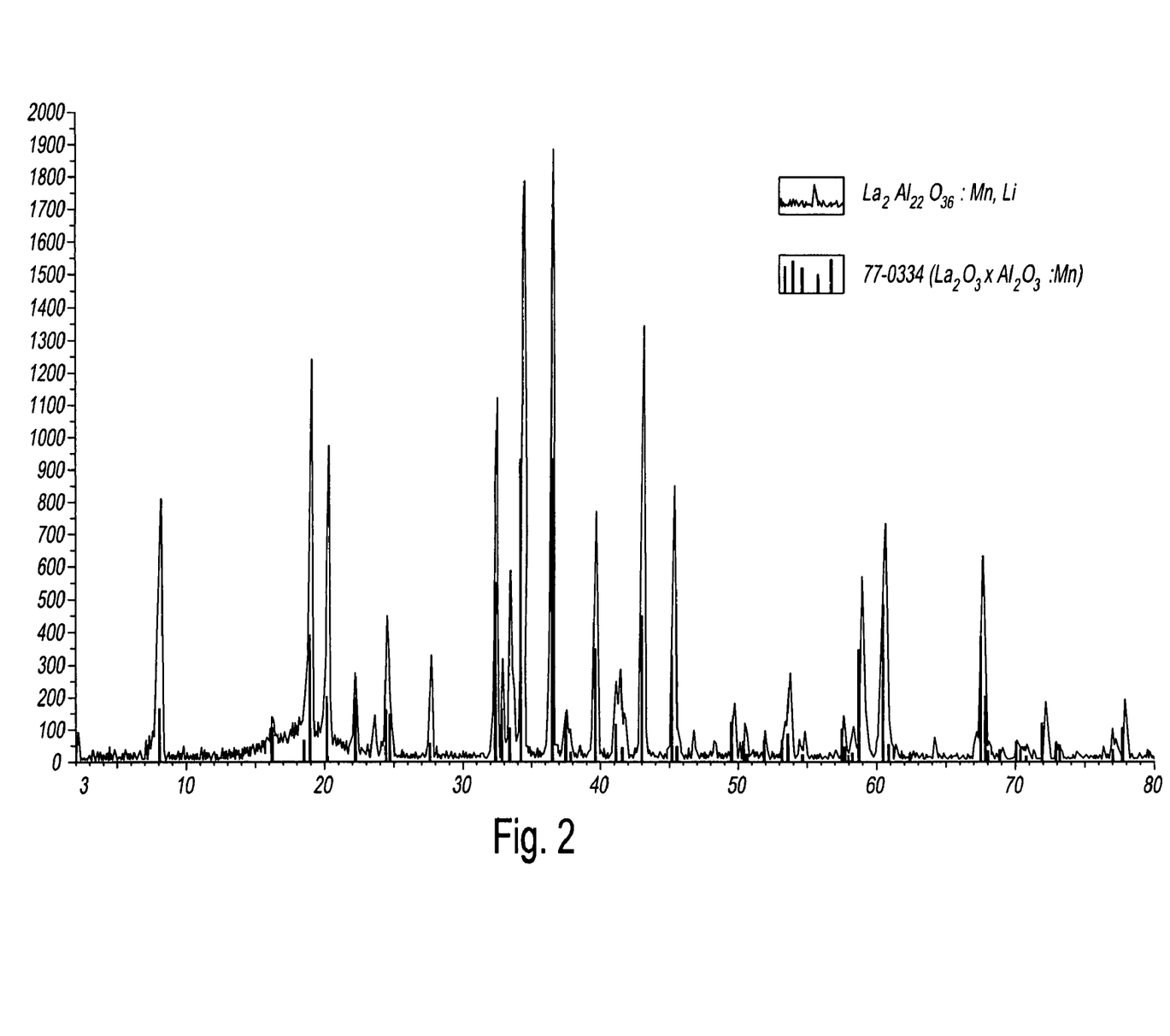
FIG. 2 shows X-ray diffraction pattern of Mn and Li activated lanthanum aluminate phosphor.

FIG. 2 shows X-ray diffraction pattern of Mn and Li activated lanthanum aluminate phosphor. Referring to FIG. 2, X-ray powder diffraction data on sample fired at 1300° C. and refired at 1200° C. ($N_2+H_2$) along with standard data from lanthanum manganese aluminum oxide (JCPDF 77–0334) is provided. The lines corresponding to lanthanum aluminate phase are more prominent above 1000° C. of firing temperature. Since the luminescence of a phosphor depends on the shape, size, crystallinity, defects and grain boundaries, the morphology and particle size distribution (PSD) of all the samples prepared at various conditions were studied.

Figure 3:
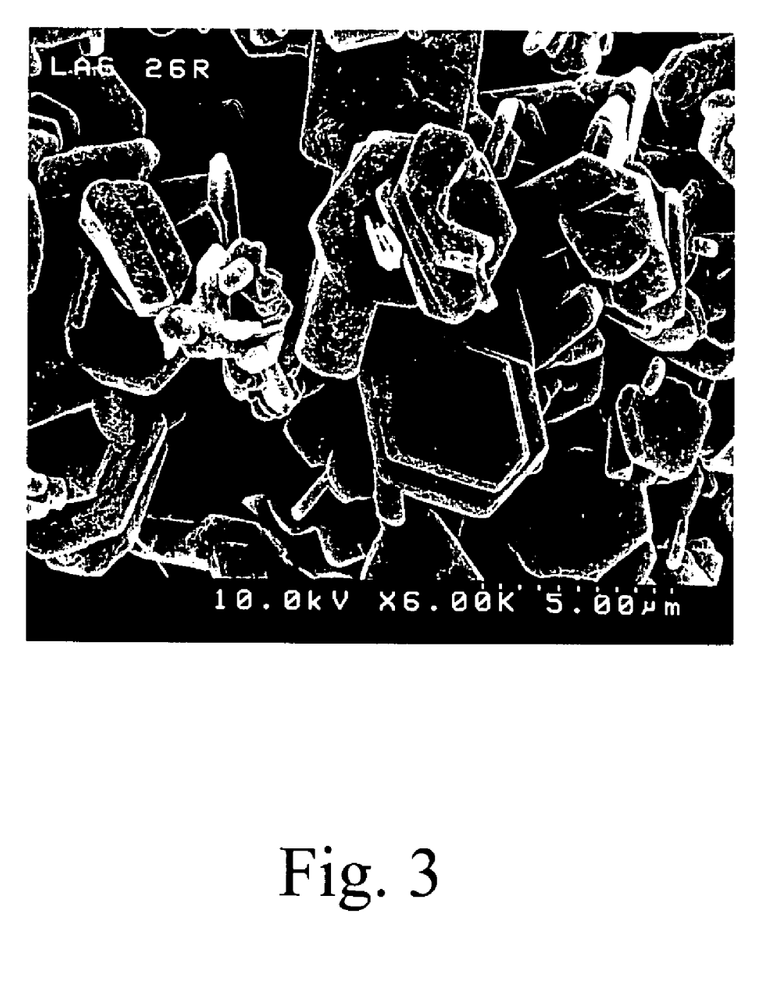
FIG. 3 is a scanning electron micrograph of Mn and Li activated lanthanum aluminate phosphors.

FIG. 3 is a scanning electron micrograph of Mn and Li activated lanthanum aluminate phosphors. The scanning electron micrographs of phosphor samples prepared from inorganic salts are studied with the help of Hitachi S-4500 scanning electron microscope. Referring to the micrograph in FIG. 3, one can observe that the phosphor particles are very uniform in size and well crystallized.

Figure 4:
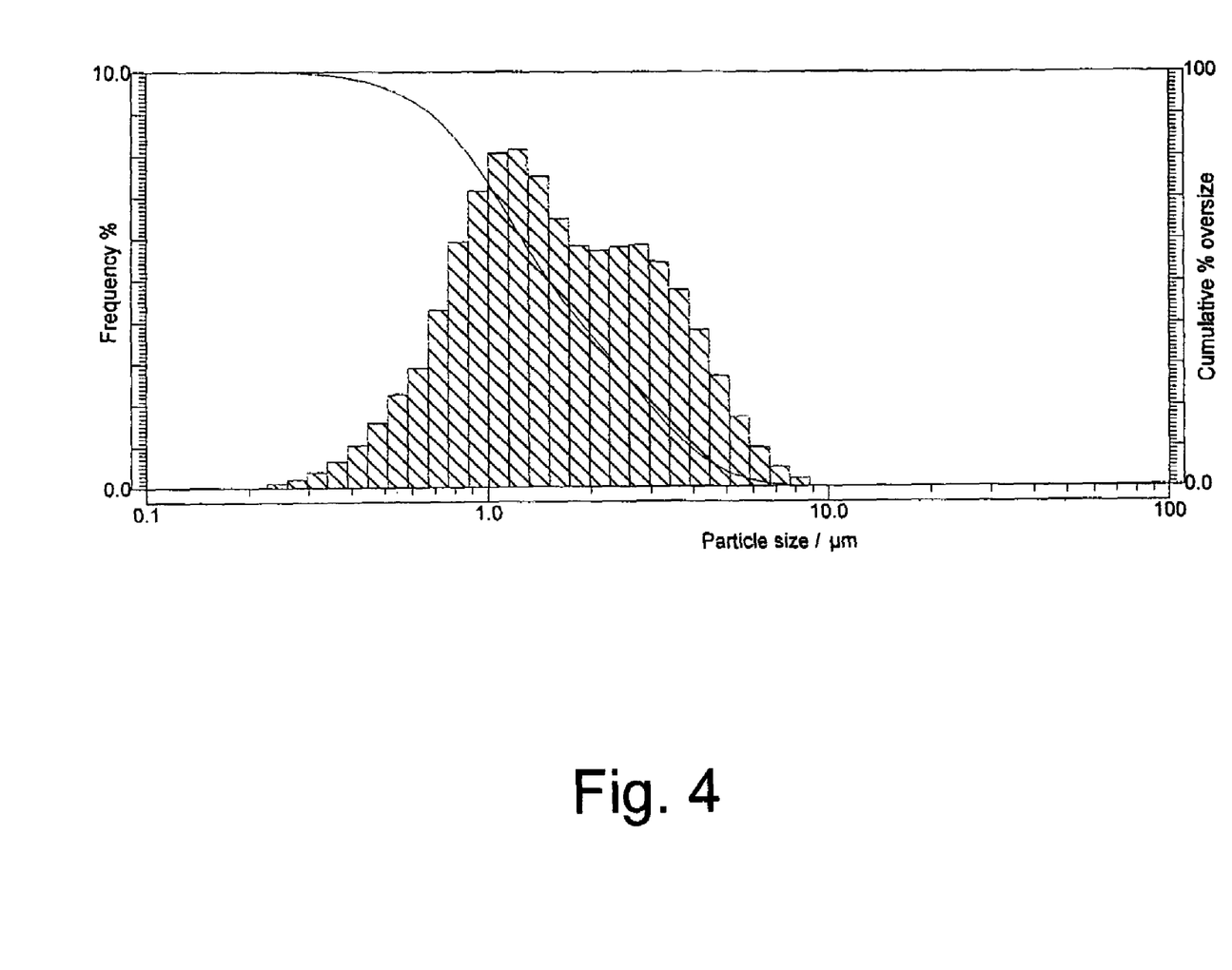
FIG. 4 presents the particle size distribution of Mn and Li activated lanthanum aluminate phosphor of present invention.

FIG. 4 presents the particle size distribution of Mn and Li activated lanthanum aluminate phosphor of present invention. FIG. 4 shows PSD of these phosphors measured on particle size analyzer, Horiba LA-190. It is observed that all the particles are below 10 microns with mean diameter 2.0 microns and median 1.5 microns. The samples are washed with water after calcination to eliminate very small particles (<0.05 microns) as well as un-reacted residues and allowed to dry. The emission characteristics of these phosphors are carried out on compacted powders as well as screen-printed coupons, at room temperature.

Figure 5:
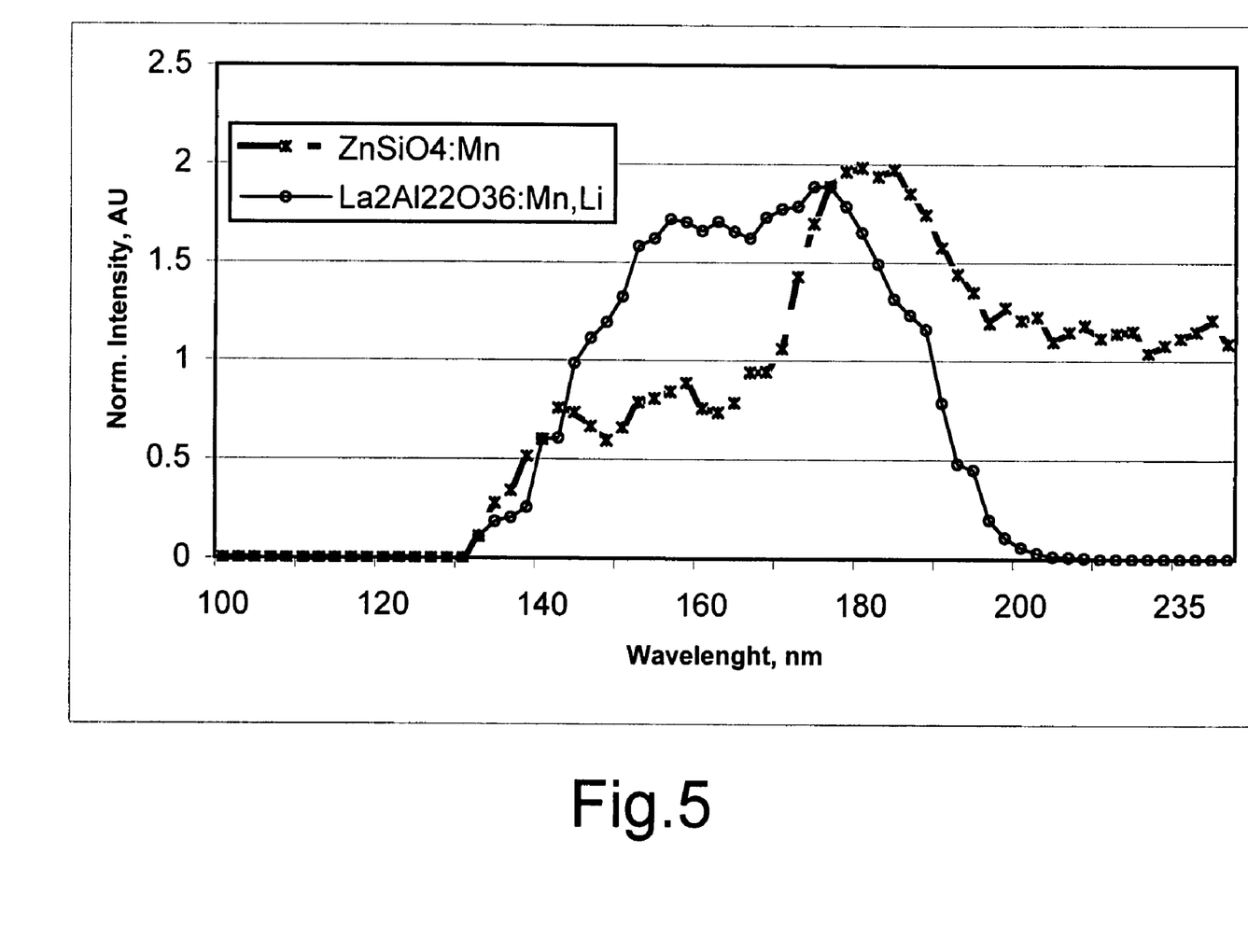
FIG. 5 shows excitation spectra of Mn and Li activated lanthanum aluminate phosphor of present invention and Mn activated zinc silicate phosphor recorded at room temperature in VUV region after excitation with continuous D$_2$ lamp.

FIG. 5 shows excitation spectra of Mn and Li activated lanthanum aluminate phosphor of present invention. The emission at 515 nm was recorded at room temperature in VUV region after excitation with continuous Deuterium ($D_2$) Lamp. Referring to FIG. 5, the excitation spectrum of Mn and Li activated lanthanum aluminate phosphors prepared from metal salts and alumina is recorded at room temperature with the help of $D_2$ continuum lamp in the wavelength range 100 to 200 nm. The emission spectra of Mn and Li activated lanthanum aluminate phosphors prepared from metal salts are recorded at room temperature while exciting with custom-made VUV lamps (147 nm and 173 nm).

Figure 6:
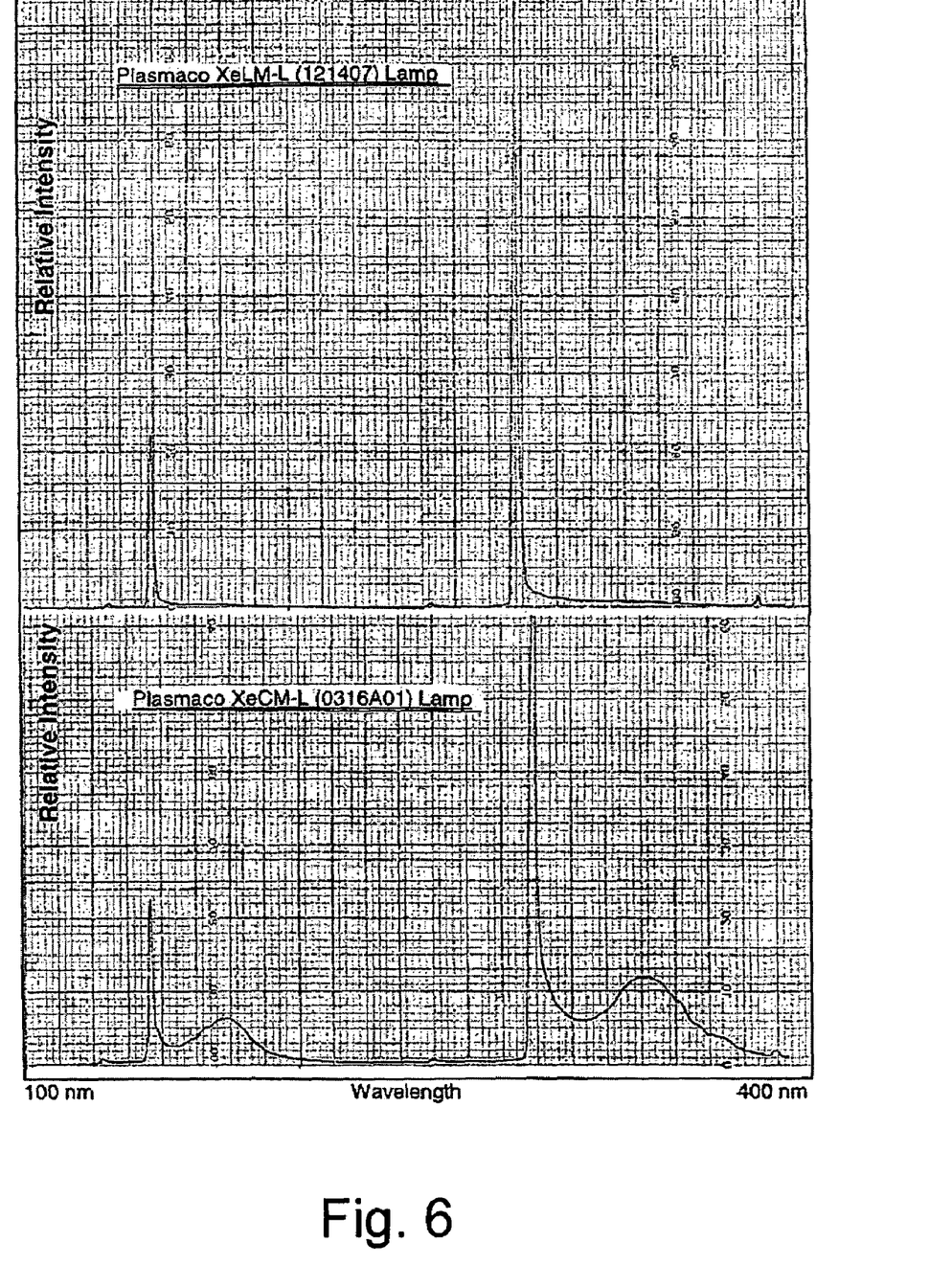
FIG. 6 shows the spectral energy distribution of custom-made VUV lamps (147 and 173 nm) with out filters.

FIG. 6 shows the spectral energy distribution of custom-made VUV lamps. These lamps are used to excite phosphors in conjunction with 147 and 173 nm band pass filters.

Figure 7:
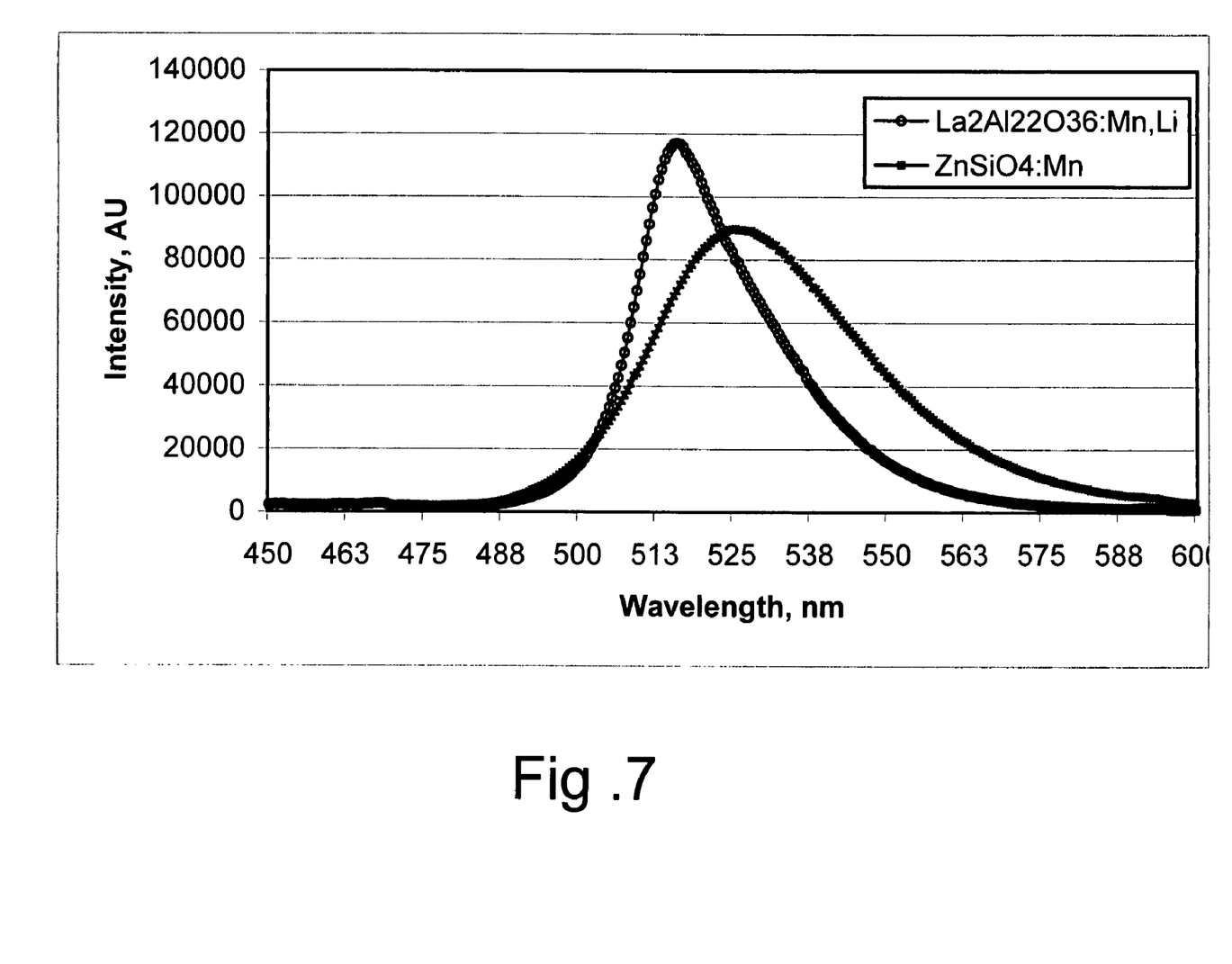
FIG. 7 shows emission spectra of Mn and Li activated lanthanum aluminate phosphor of present invention and Mn activated zinc silicate phosphor excited at 147 nm. The emission was recorded at room temperature.
Figure 8:
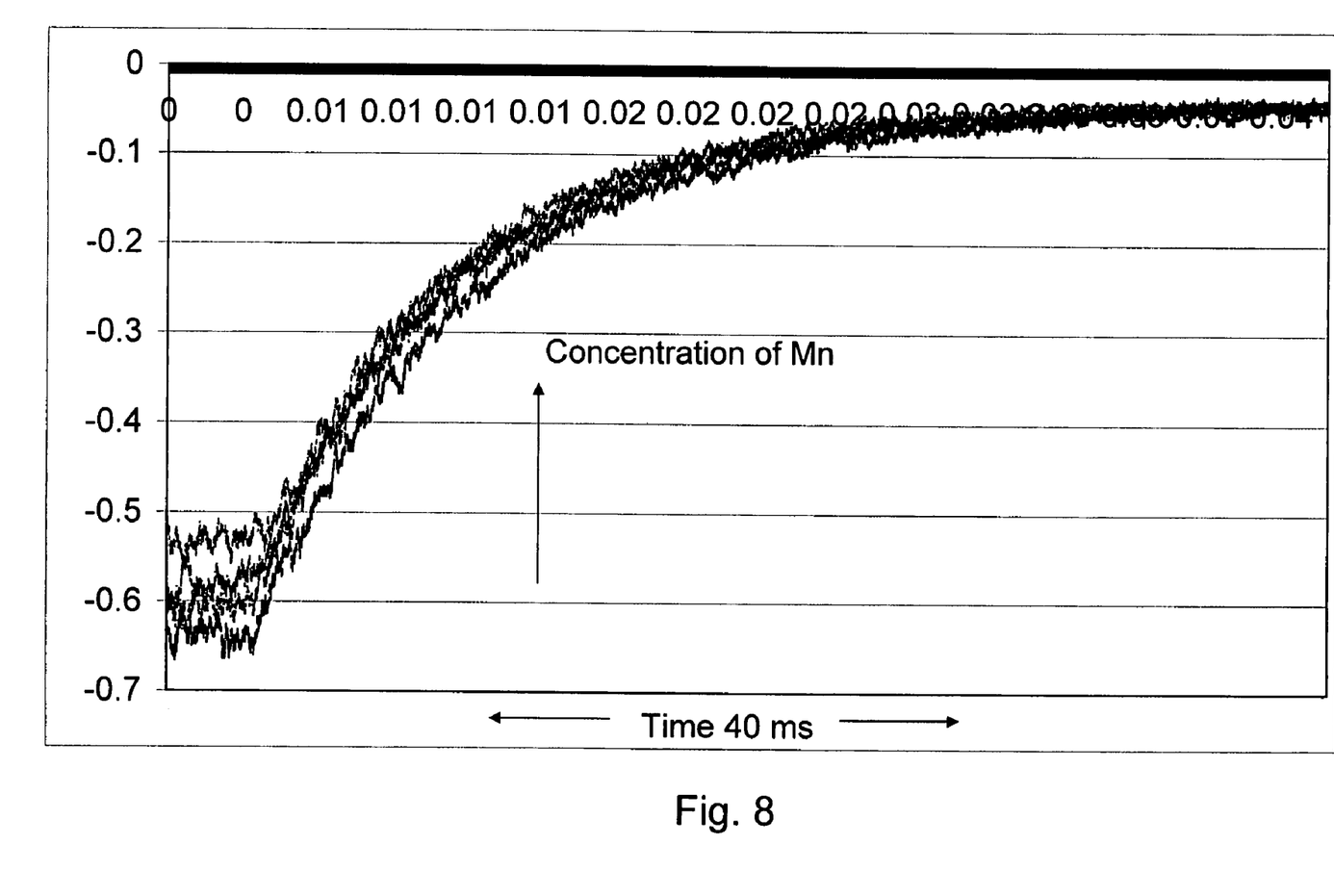
FIG. 8 shows persistence of Mn and Li activated lanthanum aluminate phosphors recorded at room temperature (excitation source custom made Xenon lamp with 147 nm filter).

FIG. 7 shows emission spectra of Mn and Li activated lanthanum aluminate phosphor of present invention and Mn activated zinc silicate phosphor excited at 147 nm. The emission was recorded at room temperature. Referring to FIG. 8, decay characteristics (after glow decay or persistence) of lanthanum aluminate phosphor activated with Li and different amounts of Mn recorded at room temperature while exciting with Xe lamp (147 nm) is shown.

Figure 9:
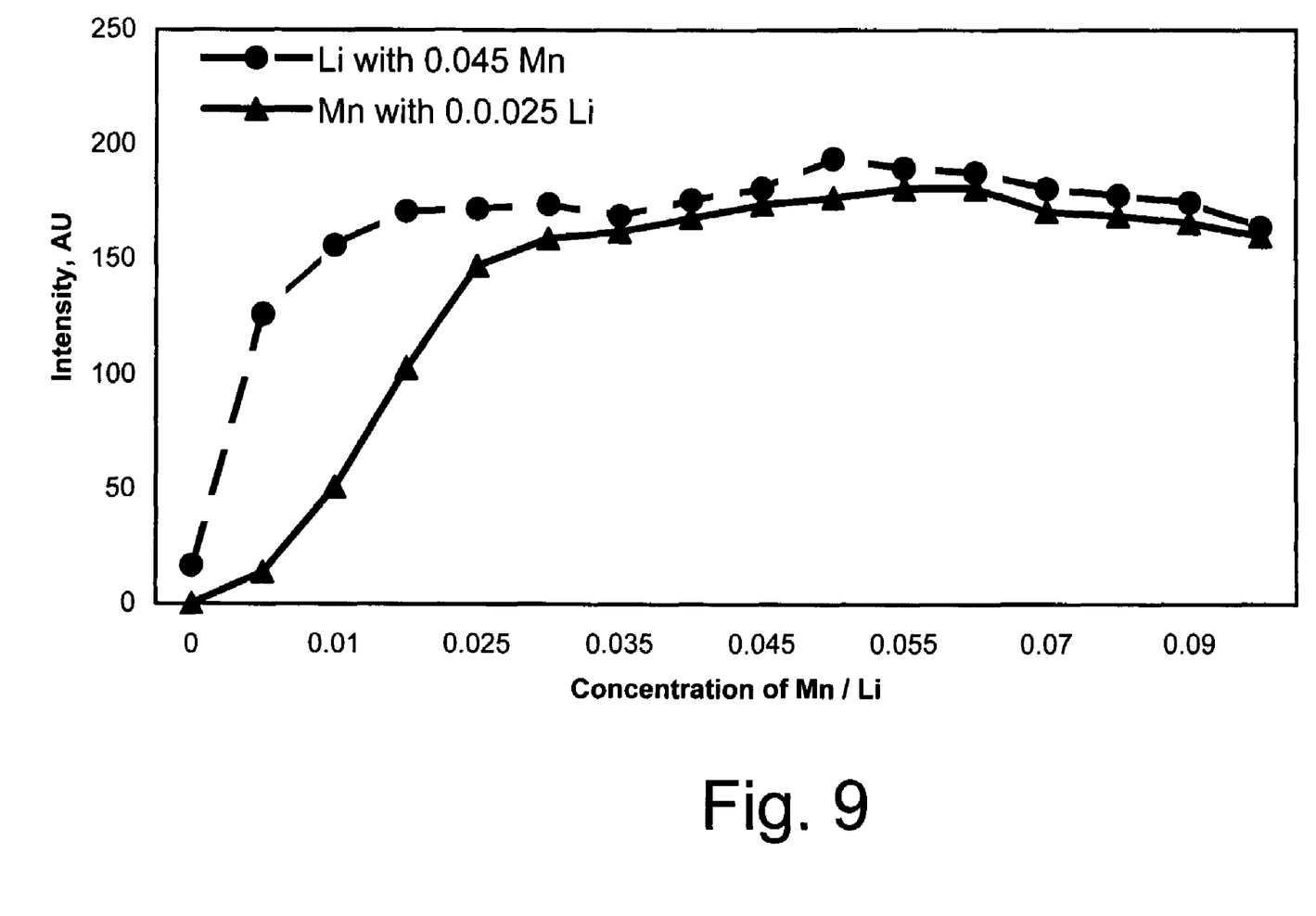
FIG. 9 represents the variation in intensity with the concentration of Mn and Li in lanthanum aluminate phosphors.
Figure 10:
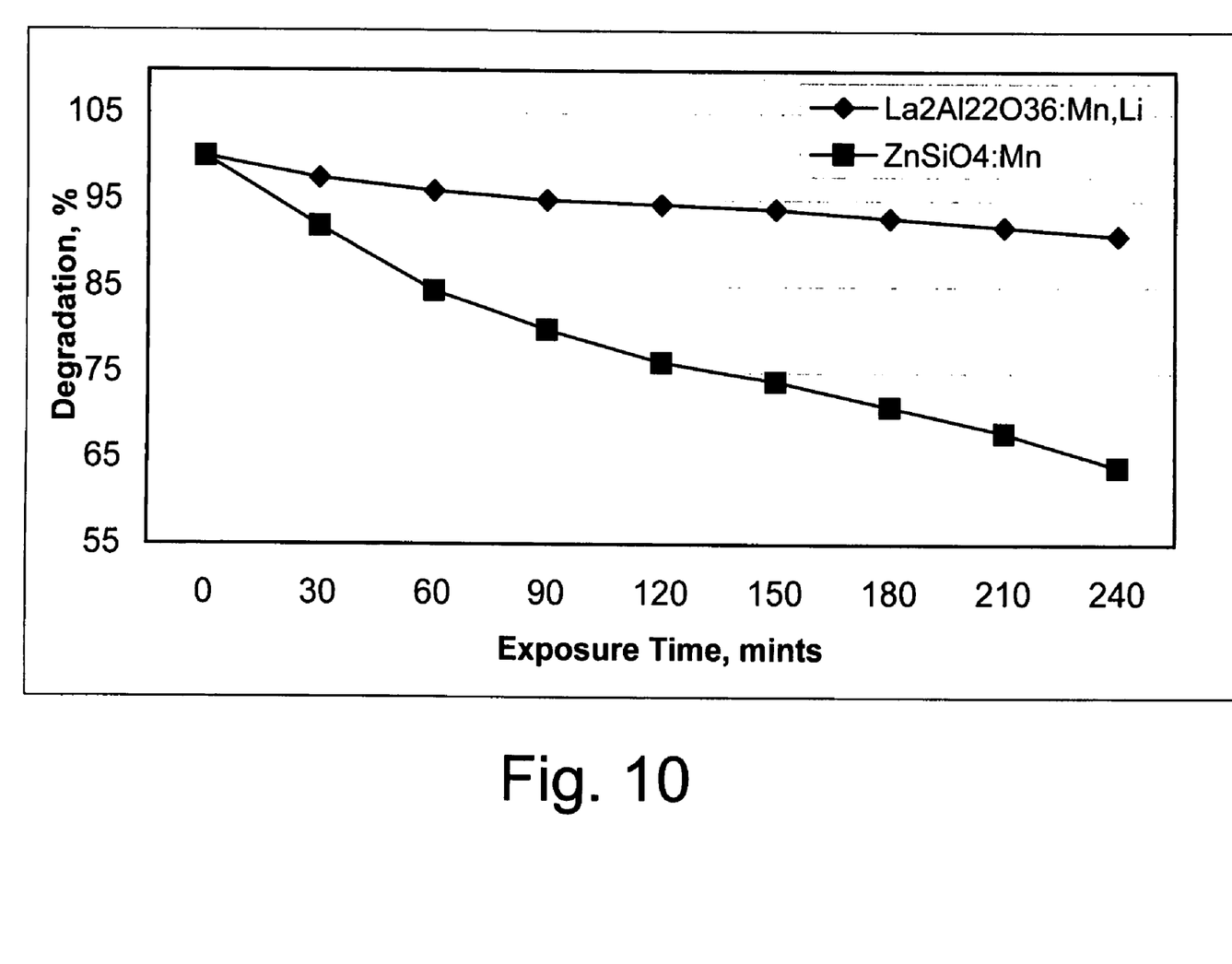
FIG. 10 shows the degradation in intensity of Mn and Li activated lanthanum aluminate phosphors exposed to high energy VUV lamp.

FIG. 9 represents the variation in intensity with the concentration of Mn and Li. It is observed that the emission intensity of these samples increases with increase of Mn and Li concentrations and then decreases after certain amount of activators due to concentration quenching. Referring to FIG. 10, degradation of the present phosphor along with other green emitting phosphor material ($ZnSiO_4$:Mn), can be seen. When compared with the standard $ZnSiO_4$:Mn phosphor, the degradation of Mn and Li activated lanthanum aluminate phosphor is low.

FIG. 10 shows the degradation in intensity of Mn and Li activated lanthanum aluminate phosphors exposed to high energy VUV lamp.

Preferably, the phosphor pastes are prepared by mixing the phosphor powders with a suitable vehicle contains a solvent (terpineol or butyl carbolite acetate (BCA)/butoxy-ethoxy ethyl acetate) and a binder (ethyl cellulose or polyvinyl butyral).

The vehicle is premixed in a high speed vertical stirrer by adding require amounts of solvent and binder. The phosphor paste is rolled in a three-roller grinder until the paste become very soft. Pastes of different phosphor are screen printed on small circular glass coupons (1" dia). After drying the glass plates with phosphor pastes at 120 to 140° C. is subjected to binder burn out process at 500° C. for 1 to 4 hours until all the organics are evaporated.

The study of luminescent and life characteristics of these phosphor materials are carried out on the glass coupons. Degradation of these with exposure of UVU radiation is calculated by measuring the intensity before and after exposing the phosphor screens to high energy Xe flash lamp in $N_2$ atmosphere or Xe lamp in vacuum for different durations of time. It is found that the degradation of the present phosphor is minimal when compared to other PDP green emitting phosphors.

After preliminary studies in the laboratory, suitable phosphor pastes are screen printed on back plate (42"). After binder-burn out (500° C.), the back plate with phosphor is frit sealed with front plate and filled with Xe—Ne gas mixture as described above.

After backing cycle with gas fill, the assembly (front and back plate) is connected to all required electronics. Luminescent properties such as brightness, intensity, spectral energy distribution, after glow decay, color coordinates, color temperature, etc., stability or life span and electrical characteristics, such as, capacitance, discharge leakage, discharge delay, variation in sustain voltage, and ramp voltage, are studied on these panels.

The phosphor material of the present invention emits green light when excited by vacuum ultra violet light of wavelength in the range of 100 nm to 200 nm and, as such, is suitable for use in plasma display panels.

Accordingly, the present invention provides an improved plasma display panel (PDP), having a front plate with electrodes, dielectric layer, a thin protecting layer (MgO), a back plate with electrodes, reflective layer, ribs, phosphors, and a plurality of discharge spaces formed between the front and back plates having phosphor layers, wherein the improvement comprises:

a plasma display panel which includes a green emitting phosphor material comprising a composition represented by the formula:

$La_{2-x-y}B_{22}O_{36}:Mn_x.A_y$ wherein: A=Li, Na or K; B=Al or Al+Ga; and $0.01 \leq x \leq 0.1$ and $0.01 \leq y \leq 0.1$, which phosphor emits green light when excited by vacuum ultra violet light of wavelength in the range of 100 nm to 200 nm.

Further details of this invention will be described with reference in some of the following examples.

EXAMPLE I

The preparation of Mn and Li activated lanthanum aluminate phosphor by a solid-state reaction is described in this example.

First, 28 grams of gamma (80–95%)—alpha (5–20%) aluminum oxide (0.01 to 0.02 micron powder), 18 grams of lanthanum oxalate, 0.34 grams of manganese fluoride (II), 1 gram of lithium fluoride are mixed in a mortar and pestle and transferred to high grade alumina crucible. The crucible is covered with lid and calcined at 1200 to 1400° C. for 2 to 4 hours in a box furnace. Samples are re-fired in a forming gas (4.5% $H_2$+95.5% $N_2$) at 1100 to 1300° C. for 2 to 4 hours in a tube furnace. The sample is left in the furnace in presence of forming gas until it cools down to room temperature.

After cooling, these fine phosphor powders are subjected to ultrasonic agitation in water. Ultrasonic treatment helps to break the clusters into individual particles. After washing with water, these powders are dried at 120° C. for 6 hours.

Depending on the required amounts, this can be scaled up. The emission, color coordinates and persistence characteristics of the above phosphor recorded at room temperature while exciting with excitation sources (Xe lamp) are given in Table I.

EXAMPLE II

The preparation procedure is the same as in example I except 0.34 grams of manganese fluoride (II) is replaced by 0.42 grams of manganese carbonate.

EXAMPLE III

The preparation procedure is the same as in example I except 0.34 grams of manganese fluoride is replaced by 0.65 grams of manganese nitrate.

EXAMPLE IV

The preparation procedure is the same as in example I except 1 gram of lithium fluoride is replaced by 1.54 grams of sodium fluoride.

EXAMPLE V

The preparation procedure is the same as in example I except 1 gram of lithium fluoride is replaced by 2 grams of potassium fluoride.

EXAMPLE VI

The preparation of Mn and Li activated lanthanum aluminate phosphor in an acid catalyzer by a sol-gel process is described in this example. 28 grams of aluminum isopropoxide (AIP) is dissolved in 4 liters of hot water (95° C.) while stirring. 9 grams of lanthanum nitrate, 0.4 grams of lithium fluoride and 0.18 grams of manganese fluoride are added to AlP solution. When the solution reaches 110° C., 5 cc $HNO_3$ (0.5 mol) is added drop wise and refluxed for 24 hours. A water condenser column is maintained at 20° C. throughout the reflux by use of a circulating chiller. After cooling the flask to room temperature, the solution (dilute gel) is transferred into a crystallizing dish (3 L capacity) and left in an open atmosphere. After 5 to 6 days, the solution becomes a gel. These transparent hard gels are left at 45 to 50° C. for 12 hours in a lab oven.

The dried product appears like soft glass, called xerogel. After crushing the gel in a glass mortar and pestle, a fine powder is collected into a high-grade alumina crucible and fired at 300° C. for 2 hours (rate of heating is 2°/min.) and then subjected to high temperature heat cycles, cooling and washing as described in Example I.

EXAMPLE VII

The procedure is the same as in example VI except 28 grams of aluminum isopropoxide is replaced by 34 grams of aluminum s-butoxide.

EXAMPLE VIII

Synthesis of diluted gels from lanthanum nitrate, manganese salt and aluminum isopropoxide in an acid medium is the same as described in Example VI and VII. Gel solutions obtained are subjected to freeze drying under vacuum. A cold trap is introduced between the vacuum pump and vacuum jar with gel.

Dried powder is collected after a few hours of freeze drying at the bottom of the flask. These powders are subjected to calcination, cooling, washing and measurements as described in Example I.

EXAMPLE IX

Synthesis of diluted gels from lanthanum nitrate, manganese salt and aluminum isopropoxide in an acid medium is the same as described in Example VI. These diluted gels are sprayed through a spray nozzle in a 4" diameter glass tube, with a 12" heating zone at 120 to 150° C. Fine particles can also be produced using an ultrasonic aerosol generator (nebulizer). After spraying about a liter of dilute gel, very fine powder is scraped from the walls of the tube. The powders are subjected to calcination, cooling washing and measurements as in Example I.

EXAMPLE X

The preparation procedure is the same as in example I except 28 grams of aluminum oxide is replaced by 26 grams of aluminum oxide and 3.7 grams of gallium oxide.

Table I demonstrates that the phosphors formed by solid state reaction and sol-gel processes of the present invention, provide various particle size ranges, while also generally providing a higher level of brightness, low dielectric constant, longer life and shorter persistence.

TABLE I

Luminescence Characteristics and Morphology of Manganese and Alkali Metal Activated Lanthanum Aluminate Phosphors

| Method of | Relative Intensity (AU) at Excitation | Half Width | Persistence (10%) | Color Coordinates | Particle Size |
| --- | --- | --- | --- | --- | --- |

| Preparation | 147 nm | 173 nm | nm | (ms) | x | y | (μm) |
|---|---|---|---|---|---|---|---|
| Example-I | 105 | 100 | 23.56 | 9.0 | 0.125 | 0.772 | 0.1–10 |
| Example-II | 104 | 98 | 23.26 | 9.0 | 0.125 | 0.772 | 0.1–10 |
| Example-III | 100 | 94 | 23.64 | 9.0 | 0.125 | 0.772 | 0.1–10 |
| Example-IV | 97 | 92 | 25.08 | 8.5 | 0.125 | 0.775 | 0.1–12 |
| Example-V | 89 | 87 | 24.88 | 8.5 | 0.128 | 0.775 | 0.2–12 |
| Example-VI | 75 | 73 | 25.22 | 9.0 | 0.125 | 0.778 | 0.05–5 |
| Example-VII | 74 | 71 | 24.86 | 9.0 | 0.125 | 0.773 | 0.05–5 |
| Example-VIII | 76 | 73 | 25.05 | 9.0 | 0.125 | 0.773 | 0.05–5 |
| Example-IX | 63 | 61 | 23.81 | 9.0 | 0.125 | 0.774 | 0.01–3 |
| Standard P1[a] (ZnSiO$_4$:Mn) | 76 | 80 | 45.24 | 9.0 | 0.228 | 0.714 | 0.5–10 |

[a]Standard P1 is available from Kasei Optonix Ltd., Japan.

It should be understood that the foregoing description is only illustrative of the invention. Various alternatives and modifications can be devised by those skilled in the art without departing from the invention. Accordingly, the present invention is intended to embrace all such alternatives, modifications and variances that fall within the scope of the appended claims.

What is claimed is:

1. A green emitting Mn and alkali metal activated lanthanum aluminate phosphor having the empirical formula:

$$La_{2-x-y}B_{22}O_{36}:Mn_x \cdot A_y$$

wherein: A=Li, Na or K; B=Al or Al+Ga; and $0.01 \leq x \leq 0.1$ and $0.01 \leq y \leq 0.1$.

2. The green emitting Mn and alkali metal activated lanthanum aluminate phosphor of claim 1, prepared by a method comprising the steps of:
   reacting a dilute solution comprising a source of alkali, a source of lanthanum, a source of manganese and a source of aluminum, in an acid medium to form a gel;
   converting said gel into a gel powder by removing excess water; and
   thermally decomposing the powder at specified temperatures to produce said phosphor.

3. The phosphor of claim 2, wherein said source of lanthanum is selected form the group consisting of: lanthanum oxalate, lanthanum nitrate, lanthanum oxide, and mixtures thereof; said source of alkali is selected from the group consisting of: alkali halide, alkali nitrate, alkali carbonate, alkali hydroxide, and mixtures thereof; said source of aluminum is selected form the group consisting of: aluminum oxide, aluminum isopropoxide, aluminum s-butoxide, an organic source providing aluminum, and mixtures thereof.

4. The phosphor of claim 2, wherein said gel is thermally decomposed in an open atmosphere at a temperature from abut 1000° C. to about 1400° C. and then at a temperature from about 1000° C. to about 1300° C. in forming gas.

5. The phosphor of claim 2, wherein said gel is dried to form said gel powder prior to thermal decomposition.

6. The phosphor of claim 2, wherein said gel is vacuum dried to form said gel powder as an aerogel prior to thermal decomposition.

7. The phosphor of claim 2, wherein said gel is spray dried to form said gel powder prior to thermal decomposition.

8. The phosphor of claim 1, wherein said phosphor has a particle size from about 0.01 microns to about 10.0 microns.

9. The phosphor of claim 1, wherein said phosphor exhibits a relative intensity (AU) at 147 nm excitation from about 90 to about 100 and relative intensity (AU) at 173 nm excitation from about 90 to about 105 with half width from about 23 to about 25 nm.

10. The phosphor of claim 1, wherein said phosphor exhibits a persistence from about 7 ms to about 10 ms.

11. The phosphor of claim 1, wherein said phosphor exhibits color coordinates of x from about 0.116 to about 0.136 and y from about 0.752 to about 0.782.

12. A method of producing a green emitting Mn and alkali metal activated lanthanum aluminate phosphor having the empirical formula:

$$La_{2-x-y}B_{22}O_{36}:Mn_x \cdot A_y$$

wherein: A=Li, Na or K; B=Al or Al+Ga; and $0.01 \leq x \leq 0.1$ and $0.01 \leq y \leq 0.1$; and wherein said method comprises the steps of:
   reacting a dilute solution comprising a source of alkali, a source of lanthanum, a source of manganese and a source of aluminum, in an acid medium to form a gel;
   converting said gel into a gel powder by removing water; and
   thermally decomposing the powder at specified temperatures to produce said phosphor.

13. The method of claim 12, wherein said source of lanthanum is selected form the group consisting of: lanthanum oxalate, lanthanum nitrate, lanthanum oxide, and mixtures thereof; said source of alkali is selected from the group consisting of: alkali halide, alkali nitrate, alkali carbonate, alkali hydroxide, and mixtures thereof; said source of aluminum is selected form the group consisting of: aluminum oxide, aluminum isopropoxide, aluminum s-butoxide, an organic source providing aluminum, and mixtures thereof.

14. The method of claim 12, wherein said gel is thermally decomposed in an open atmosphere at a temperature from abut 1000° C. to about 1400° C. and then at a temperature from about 1000° C. to about 1300° C. in forming gas.

15. The method of claim 12, wherein said gel is dried to form said gel powder prior to thermal decomposition.

16. The method of claim 12, wherein said gel is vacuum dried to form said gel powder as an aerogel prior to thermal decomposition.

17. The method of claim 12, wherein said gel is spray dried to form said gel powder prior to thermal decomposition.

18. The method of claim 12, wherein said phosphor has a particle size from about 0.01 microns to about 10.0 microns.

19. The method of claim 12, wherein said phosphor exhibits a relative intensity (AU) at 147 nm excitation from about 90 to about 100 and relative intensity (AU) at 173 nm excitation from about 90 to about 105 with half width from about 23 to about 25 nm.

20. The method of claim 12, wherein said phosphor exhibits a persistence from about 7 ms to about 10 ms.

21. The method of claim 12, wherein said phosphor exhibits color coordinates of x from about 0.116 to about 0.136 and y from about 0.752 to about 0.782.

22. The method of claim 12, wherein said source of lanthanum is lanthanum oxalate, source of alkali is selected from the group consisting of: alkali halide, alkali nitrate; said source of manganese is selected from the group consisting of: manganese nitrate and said source of aluminum is aluminum oxide.

23. The method of claim 12, wherein said source of lanthanum is lanthanum oxalate; said source of manganese is manganese fluoride; said source alkali is alkali fluoride; and said source of aluminum is aluminum oxide.

24. The method of claim 12, wherein said powder is thermally decomposed in an open atmosphere at 1300° C. and then at a temperature equal 1200° C. in a forming gas contains 4.0 to 5.0% of $H_2$ and remaining $N_2$.

25. The method of claim 12, wherein said gel is dried to form a xerogel and said xero-gel is crushed to form a powder prior to thermal decomposition.

26. The method of claim 12, wherein said gel is vacuum dried to form aero-gel and said aero-gel is crushed to form a powder prior to thermal decomposition.

27. The method of claim 12, wherein said gel is spray dried to form gel powder and said gel powder is crushed to form a powder prior to thermal decomposition.

28. The method of claim 12, wherein said gel is sprayed ultrasonically and dried to form gel powder and said gel powder is crushed to form a powder prior to thermal decomposition.

29. The method of claim 12, wherein said phosphor has a particle size in the range of 0.01 to 10.0 microns.

30. The method of claim 25, wherein said powder has a particle size in the range of 0.05 to 5.0 microns.

31. The method of claim 26, wherein said powder has a particle size in the range of 0.05 to 5.0 microns.

32. The method of claim 27, wherein said powder has a particle size in the range of 0.01 to 3.0 microns.

33. The method of claim 28, wherein said powder has a particle size in the range of 0.01 to 0.02 microns.

34. The method of claim 12, where said phosphor comprises from about 1.8 mole to about 1.98 mole of lanthanum, from about 0.01 mole to about 0.1 mole of manganese, and about 0.01 mole to about 0.1 mole of alkali and 22.0 mole of aluminum.

35. A phosphor material for a plasma display panel comprising a composition represented by the formula:

$$La_{2-x-y}B_{22}O_{36}:Mn_x.A_y$$

wherein: A=Li, Na or K; B=Al or Al+Ga; and $0.01 \leq x \leq 0.1$ and $0.01 \leq y \leq 0.1$, which phosphor emits green light when excited by vacuum ultra violet light of wavelength in the range of 100 nm to 200 nm.

36. An improved plasma display panel (PDP), having a front plate with electrodes, dielectric layer, a thin protecting layer (MgO), a back plate with electrodes, reflective layer, ribs, phosphors, and a plurality of discharge spaces formed between the front and back plates having phosphor layers, wherein the improvement comprises:

a plasma display panel which includes a green emitting phosphor material comprising a composition represented by the formula:

$$La_{2-x-y}B_{22}O_{36}:Mn_x.A_y$$

wherein: A=Li, Na or K; B=Al or Al+Ga; and $0.01 \leq x \leq 0.1$ and $0.01 \leq y \leq 0.1$, which phosphor emits green light when excited by vacuum ultra violet light of wavelength in the range of 100 nm to 200 nm.

37. The phosphor of claim 1, having the empirical formula:

$$La_{2-x-y}Al_{22}O_{36}:Mn_x.A_y$$

wherein: A=Li, Na, K and $0.01 \leq x \leq 0.1$ and $0.01 \leq y \leq 0.1$.

38. The phosphor of claim 1, having the empirical formula:

$$La_{2-x-y}B_{22}O_{36}:Mn_x.A_y$$

wherein: A=Li, Na or K; B=Al+Ga; and $0.01 \leq x \leq 0.1$ and $0.01 \leq y \leq 0.1$.

* * * * *